US012297977B1

(12) United States Patent
Xu et al.

(10) Patent No.: US 12,297,977 B1
(45) Date of Patent: May 13, 2025

(54) LED LAMP

(71) Applicant: SHENZHEN SNC OPTO ELECTRONIC CO., LTD., Guangdong (CN)

(72) Inventors: Jianyong Xu, Guangdong (CN); Qun Luo, Guangdong (CN); Renyan Luo, Guangdong (CN)

(73) Assignee: SHENZHEN SNC OPTO ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 18/829,267

(22) Filed: Sep. 9, 2024

(51) Int. Cl.

| | |
|---|---|
| ***F21V 14/02*** | (2006.01) |
| ***F21V 21/30*** | (2006.01) |
| ***F21V 23/04*** | (2006.01) |
| ***F21V 29/70*** | (2015.01) |
| ***F21V 31/00*** | (2006.01) |
| ***F21Y 105/16*** | (2016.01) |
| ***F21Y 113/00*** | (2016.01) |
| ***F21Y 115/10*** | (2016.01) |

(52) U.S. Cl.
CPC .............. *F21V 14/02* (2013.01); *F21V 21/30* (2013.01); *F21V 23/0435* (2013.01); *F21V 29/70* (2015.01); *F21V 31/005* (2013.01); *F21Y 2105/16* (2016.08); *F21Y 2113/00* (2013.01); *F21Y 2115/10* (2016.08)

(58) Field of Classification Search
CPC ...... F21V 14/02; F21V 21/30; F21V 23/0435; F21V 29/70; F21V 31/005; F21Y 2105/16; F21Y 2113/00; F21Y 2115/10
See application file for complete search history.

(56) References Cited

U.S. PATENT DOCUMENTS

| | | | | |
|---|---|---|---|---|
| 11,519,573 | B1 * | 12/2022 | Ma | F21V 31/005 |
| 2013/0148360 | A1 * | 6/2013 | Jeon | F21S 8/086 362/373 |
| 2014/0055037 | A1 * | 2/2014 | Kurita | G02F 1/13318 362/296.01 |
| 2016/0245490 | A1 * | 8/2016 | Jurik | F21V 15/01 |
| 2016/0286627 | A1 * | 9/2016 | Chen | H05B 47/175 |
| 2021/0112647 | A1 * | 4/2021 | Coleman | H05B 45/12 |
| 2021/0262628 | A1 * | 8/2021 | McDowell | F21V 29/70 |

* cited by examiner

*Primary Examiner* — Tsion Tumebo

(57) ABSTRACT

An LED lamp includes a heat dissipation base including a lamp panel mounting portion and a power supply mounting portion connected to an end of the lamp panel mounting portion, the lamp panel mounting portion being provided with a mounting groove; an LED lamp panel fixedly mounted in the mounting groove and including a plurality of light emitting elements; a driving power supply mounted to the power supply mounting portion; a lens plate covering the LED lamp panel; and a controlling device provided on the power supply mounting portion. The controlling device is electrically connected between the LED lamp panel and the driving power supply and is configured to control each light emitting element corresponding different positions of the lens plate to emit light and adjust brightness of each light emitting element corresponding to different positions of the lens plate.

9 Claims, 6 Drawing Sheets

LED LAMP

CROSS-REFERENCE TO RELATED APPLICATIONS

This application claims priority of Chinese Patent Application No. 202421526228.X, filed on Jul. 1, 2024, entitled "INTELLIGENT ADJUSTABLE LED LAMP", the entire content of which is incorporated herein by reference in its entirety.

TECHNICAL FIELD

The present disclosure relates to lighting devices, and in particular to an LED lamp.

BACKGROUND

LED lamps have many advantages such as energy saving, environmental protection, long life, and have been widely used in various lighting places. The existing LED lamp is generally provided with a lens panel, but a position of the lens panel of the existing LED lamp is fixed, and the position of the lens panel cannot be flexibly adjusted according to requirements of different use places, so that a light distribution direction of the LED lamp cannot be adjusted. In addition, with the progress of society, the development of science and technology, and the rapid rise of internet technology, the demand of people begins to change, and technological and intelligent products continue to appear in all aspects of people's lives. In the aspect of lighting, intelligent lighting can achieve the purpose of safety, energy saving, comfort and efficiency, and is more intelligent and humanized. Therefore, it is necessary to improve a structure of the LED lamp.

SUMMARY

According to various embodiments, an LED lamp is provided.

An LED lamp includes:

a heat dissipation base including a lamp panel mounting portion and a power supply mounting portion connected to an end of the lamp panel mounting portion, the lamp panel mounting portion being provided with a mounting groove;

an LED lamp panel fixedly mounted in the mounting groove and including a plurality of light emitting elements;

a driving power supply mounted to the power supply mounting portion;

a lens plate covering the LED lamp panel; and a controlling device provided on the power supply mounting portion, wherein the controlling device is electrically connected between the LED lamp panel and the driving power supply and is configured to control each light emitting element corresponding different positions of the lens plate to emit light and adjust brightness of each light emitting element corresponding to different positions of the lens plate.

In one of the embodiments, the plurality of light emitting elements includes at least two groups of light emitting elements arranged in a matrix.

In one of the embodiments, each group of the light emitting elements includes a first lamp bead, a second lamp bead, a third lamp bead, and a fourth lamp bead, and a distance between the first lamp bead and the second lamp bead and a distance between the third lamp bead and the fourth lamp bead range from 0.8 mm to 1.2 mm, respectively.

In one of the embodiments, the controlling device includes a first angle controller, the first angle controller includes a power supply circuit, a Bluetooth circuit, an adjustment control circuit, and a plurality of relays, the power supply circuit is electrically connected to the Bluetooth circuit and the adjustment control circuit to supply power to the Bluetooth circuit and the adjustment control circuit, the Bluetooth circuit is configured to receive a light emitting angle control signals sent by an external electronic device and transmit the light emitting angle control signal to the adjustment control circuit, the plurality of relays are electrically connected to the driving power supply and the LED lamp panel, the adjustment control circuit is configured to control the corresponding relay to turn on or off according to different light emitting angle control signals to control the driving power supply to supply power to different light emitting elements, so as to control the first lamp bead, the second lamp bead, the third lamp bead, and the fourth lamp bead to emit light.

In one of the embodiments, in response to receiving a first light emitting angle control signal by the Bluetooth circuit, and the second lamp bead and the fourth lamp bead do not emit light;

in response to receiving a second light emitting angle control signal by the Bluetooth circuit, the first lamp bead, the second lamp bead, the third lamp bead, and the fourth lamp bead emit light;

in response to receiving a third light emitting angle control signal by the Bluetooth circuit, and the first lamp bead and the third lamp bead do not emit light.

In one of the embodiments, the controlling device further includes a second angle controller, the second angle controller includes a switch base, a first electronic switch, and a first toggle, the switch base is fixed to the power supply mounting portion, the first electronic switch is fixedly mounted on the switch base, both ends of the first electronic switch are electrically connected to the driving power supply and the LED lamp panel, respectively, the first toggle is connected to the first electronic switch and is configured to be toggled to change a state of the first electronic switch, and the first electronic switch is configured to control the first lamp bead, the second lamp bead, the third lamp bead, and the fourth lamp bead to emit light according to different states thereof.

In one of the embodiments, in response to a first state of the first electronic switch, the first lamp bead and the third lamp bead emit light, and the second lamp bead and the fourth lamp bead do not emit light;

in response to a second state of the first electronic switch, the first lamp bead, the second lamp bead, the third lamp bead, and the fourth lamp bead emit light;

in response to a third state of the first electronic switch, the second lamp bead and the fourth lamp bead emit light, and the first lamp bead and the third lamp bead do not emit light.

In one of the embodiments, the controlling device further includes a color temperature controller, and the color temperature controller is configured to adjust brightness of the light emitting elements corresponding to different positions of the lens plate.

In one of the embodiments, the color temperature controller includes the switch base, a second electronic switch, and a second toggle, the second electronic switch is fixedly mounted on the switch base, both ends of the second electronic switch are electrically connected to the driving power supply and the LED lamp panel, respectively, the second toggle is connected to the second electronic switch and is configured to be toggled to change a state of the second electronic switch, and the second electronic switch is configured to control the brightness of the first lamp bead, the second lamp bead, the third lamp bead, and the fourth lamp bead according to different states thereof.

In one of the embodiments, the LED lamp further includes a first sealing ring provided between the lens plate and the LED lamp panel.

In one of the embodiments, the power supply mounting portion includes a power supply accommodating cavity and a power supply cover, the driving power supply is mounted in the power supply accommodating cavity, the power supply cover covers the power supply accommodating cavity, one end of the power supply cover is hinged to the heat dissipation base, and another end of the power supply cover is detachably connected to the heat dissipation base by screws.

In one of the embodiments, the LED lamp further includes a second sealing ring and a mounting bracket, the second sealing ring is provided between the power supply mounting portion and the power supply cover, and the mounting bracket is connected to the power supply mounting portion.

The details of one or more embodiments of the application are set forth in the accompanying drawings and the description below. Other features, objects, and advantages of the application will be apparent from the description and drawings, and from the claims.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

REFERENCE NUMERALS

Figure 1:
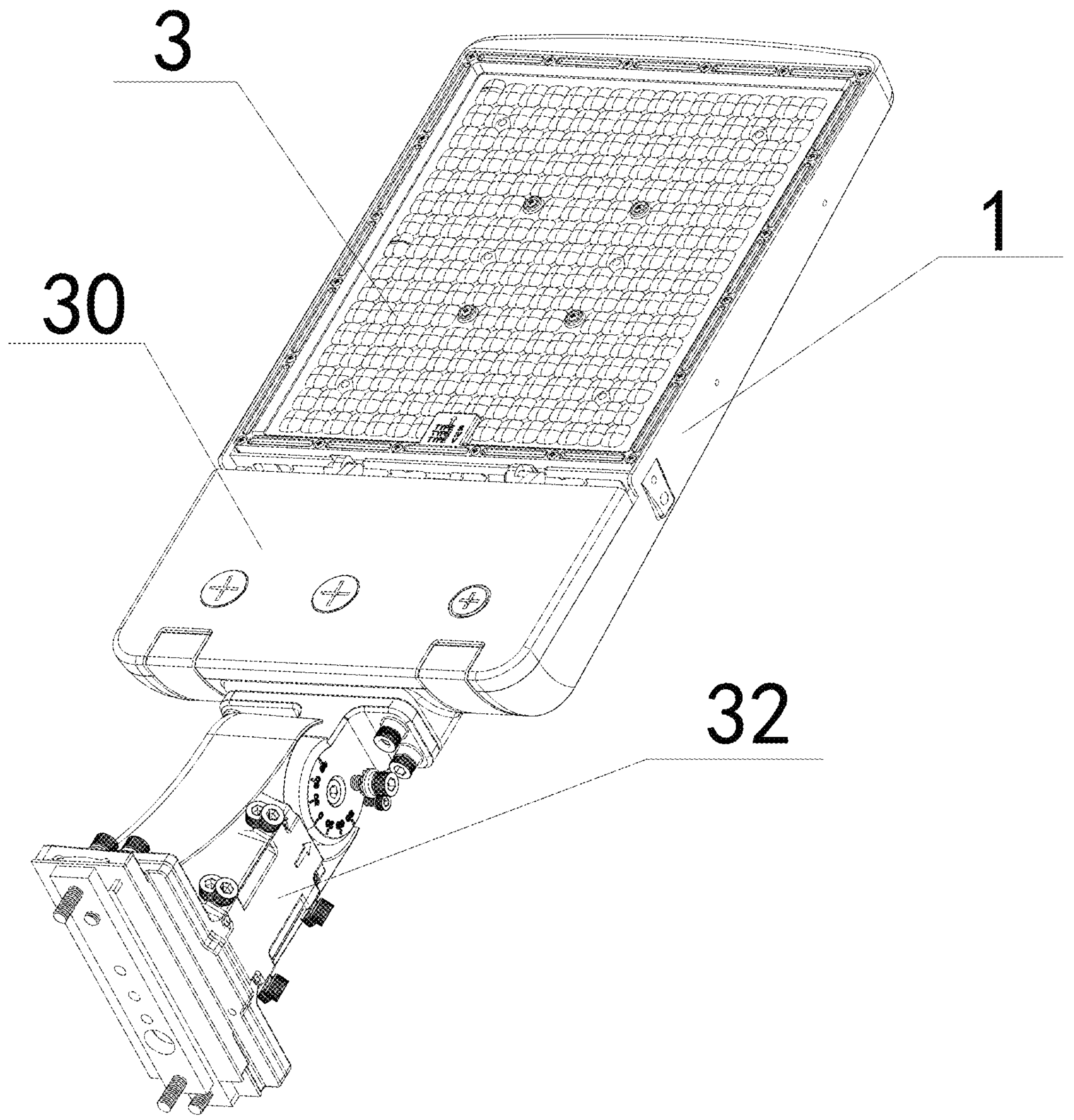
FIG. 1 is a perspective view of an LED lamp according to an embodiment.
Figure 2:
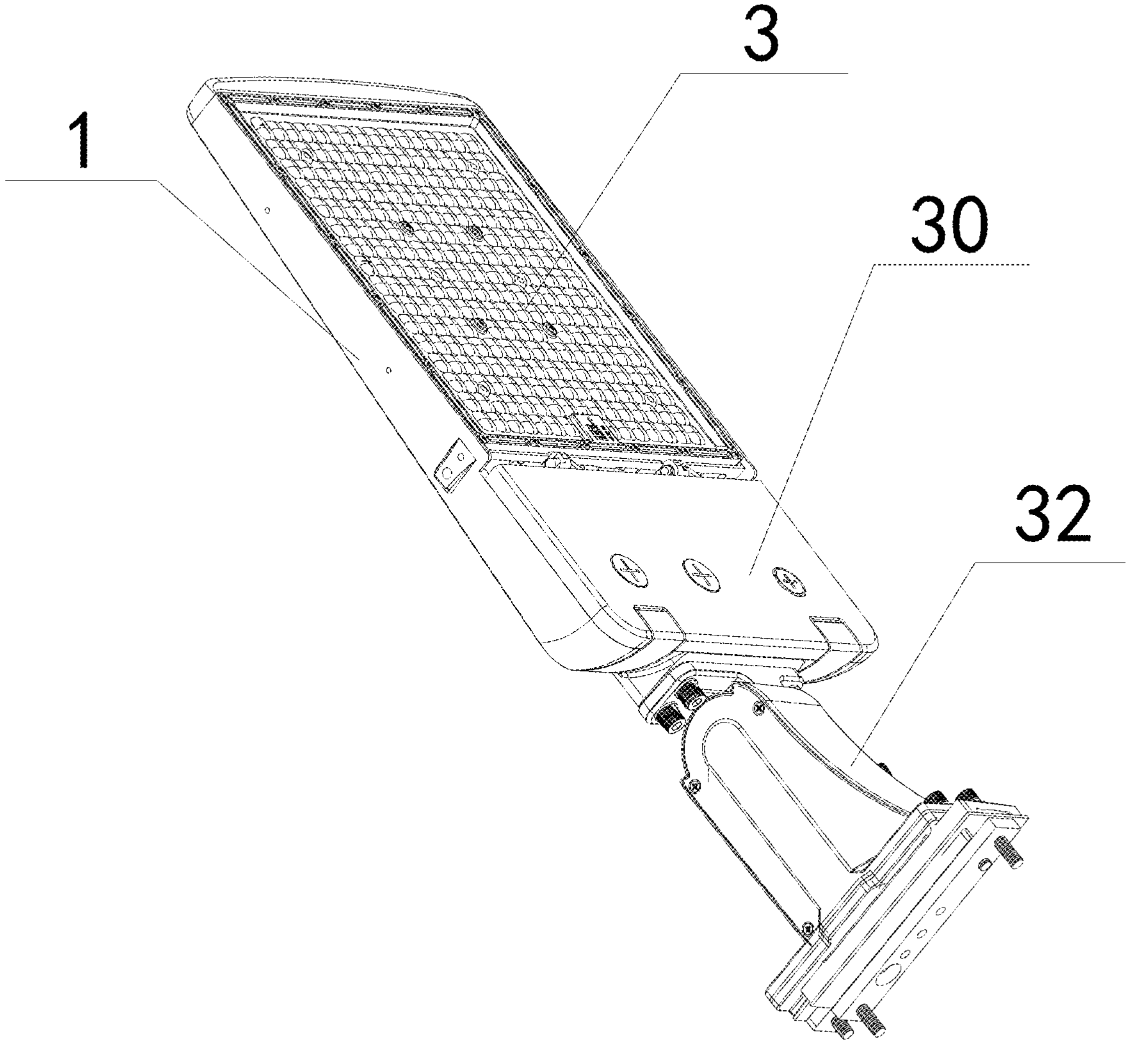
FIG. 2 is a perspective view of the LED lamp of FIG. 1 viewed from another aspect.

1, heat dissipation base; 2, LED lamp panel; 3, lens plate; 4, driving power supply; 5, lamp panel mounting portion; 6, power supply mounting portion; 7, mounting groove; 8, controlling device; 9, light emitting element; 10, first lamp bead; 11, second lamp bead; 12, third lamp bead; 13, fourth lamp bead; 14, housing; 16, power supply circuit; 17, Bluetooth circuit; 18, adjustment control circuit; 19, relay; 20*a*, first angle controller; 20*b*, second angle controller; 21, color temperature controller; 22, switch box; 23, switch base; 24, first electronic switch; 25, first toggle; 26, second electronic switch; 27, second toggle; 28, first sealing ring; 29, power supply accommodating cavity; 30, power supply cover; 31, second sealing ring; 32, mounting bracket; 100, external electronic device.

DETAILED DESCRIPTION OF THE EMBODIMENTS

The technical solution in the embodiment of the present disclosure will be clearly and completely described below in conjunction with the drawings in the embodiment of the application. Apparently, the described embodiments are only some of the embodiments of the application, not all of them. Based on the embodiments in the present disclosure, all other embodiments obtained by a person skilled in the art without making creative efforts shall all fall within the protection scope of the present disclosure.

In the drawings of the embodiments of the present disclosure, the same or similar numbers correspond to the same or similar components. In the description of the present disclosure, it should be understood that terms “upper”, “lower”, “front” and “rear”, “left”, “right”, “vertical”, “horizontal”, “lateral”, “longitudinal”, “top”, “bottom”, “inner”, “outer”, and other indicated orientation or positional relationships are based on the orientation or positional relationship shown in the drawings for convenience and simplicity of description of the present disclosure only, and not as an indication or implication that the devices or elements referred to must have or be constructed or operated in a specific orientation. Therefore, the terms describing positional relationships in the drawings are only for illustrative purposes and should not be construed as limitations of the present disclosure.

Referring to FIGS. 1 to 4, an LED lamp according to an embodiment is provided, including a heat dissipation base 1, an LED lamp panel 2, a lens plate 3, a driving power supply 4, and a controlling device 8. The heat dissipation base 1 includes a lamp panel mounting portion 5 and a power supply mounting portion 6 connected to an end of the lamp panel mounting portion 5. The lamp panel mounting portion 5 is provided with a mounting groove 7. The LED lamp panel 2 is fixedly mounted in the mounting groove 7 and includes a plurality of light emitting elements 9. The lens plate 3 covers the LED lamp panel 2. The driving power supply 4 is mounted to the power supply mounting portion 6 and is electrically connected to the LED lamp panel 2 to power the LED lamp panel 2. The controlling device 8 is electrically connected between the LED lamp panel 2 and the driving power supply 4. The controlling device 8 is provided on the power supply mounting portion 6. The controlling device 8 is configured to control each light emitting element 9 corresponding different positions of the lens plate 3 to emit light and adjust brightness of each light emitting element 9 corresponding to different positions of the lens plate 3.

By providing the above-mentioned controlling device 8, when a light emitting angle of the LED lamp needs to be adjusted, it is only required to control the light emitting elements 9 corresponding to different positions of the lens plate 3 to emit light through the controlling device 8. When a color temperature of the LED lamp needs to be adjusted, it is only required to control the brightness of the light emitting elements 9 corresponding to different positions of the lens plate 3 through the controlling device 8.

Figure 4:
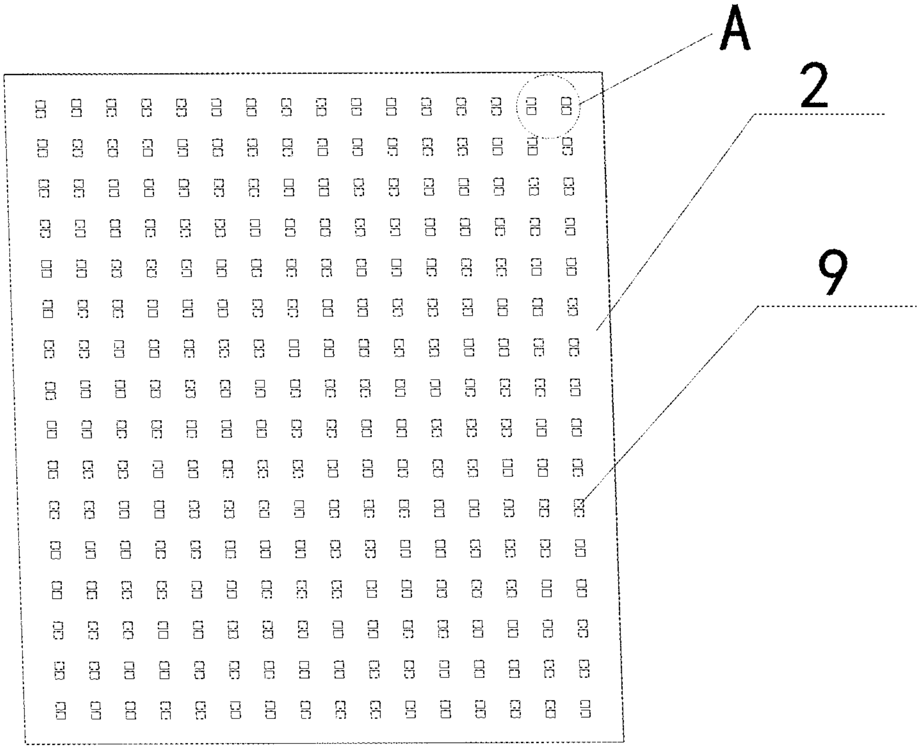
FIG. 4 is an enlarged view of an LED lamp panel in FIG. 3.
Figure 5:
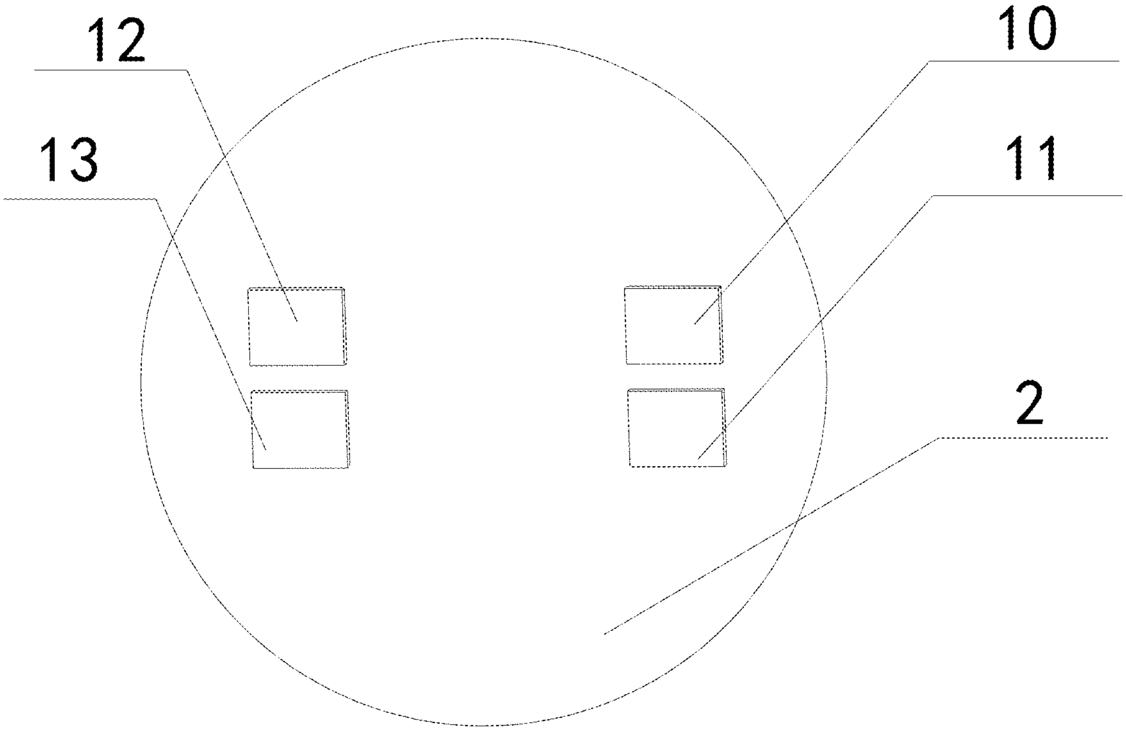
FIG. 5 is an enlarged view of a portion A of FIG. 4.

Referring to FIGS. 4 and 5, the plurality of light emitting elements 9 includes at least two groups of light emitting elements 9 arranged in a matrix. Each group of the light emitting elements 9 includes a first lamp bead 10, a second lamp bead 11, a third lamp bead 12, and a fourth lamp bead 13. A distance between the first lamp bead 10 and the second lamp bead 11 and a distance between the third lamp bead 12 and the fourth lamp bead 13 range from 0.8 mm to 1.2 mm, respectively, which can make the LED lamp achieve a better good emitting effect.

Figure 6:
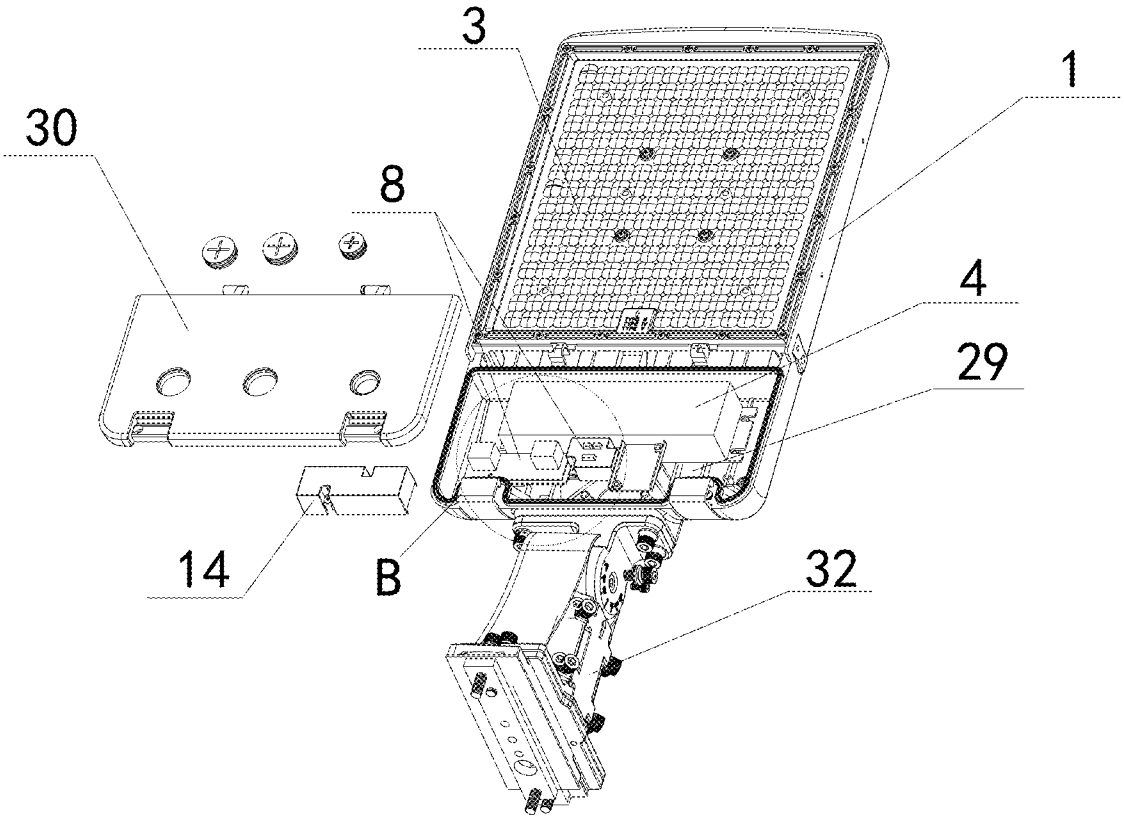
FIG. 6 is another exploded view of the LED lamp of FIG. 1.
Figure 7:
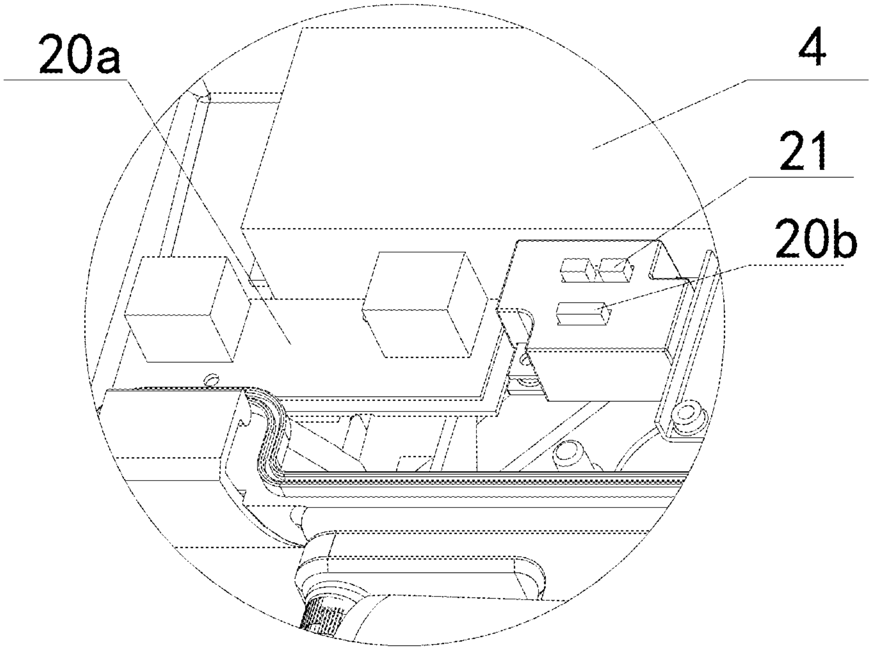
FIG. 7 is an enlarged view of a portion B of FIG. 6.
Figure 8:
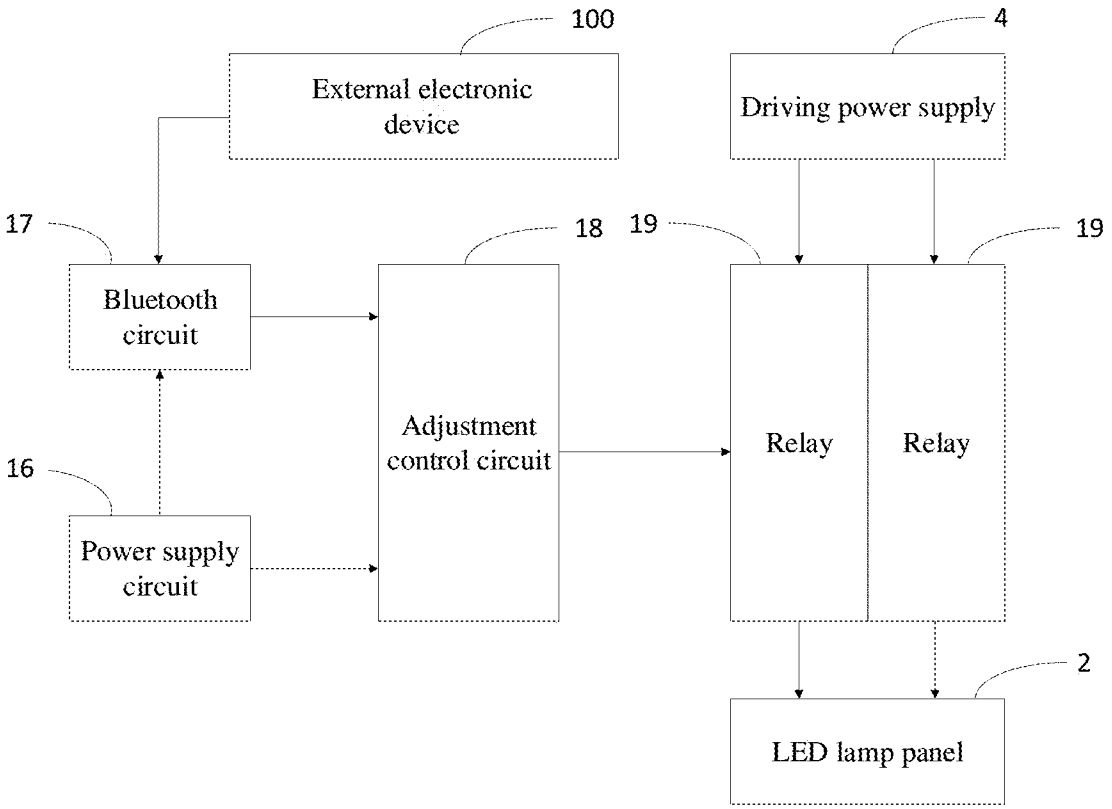
FIG. 8 is a block diagram of the LED lamp of FIG. 1.

Referring to FIGS. 6 to 8, the controlling device 8 includes a light emitting angle controller configured to control the light emitting elements 9 corresponding to different positions of the lens plate 3 to emit light.

Referring to FIG. 7, the light emitting angle controller includes a first angle controller 20*a*, which includes a power supply circuit 16, a Bluetooth circuit 17, an adjustment control circuit 18, and a plurality of relays 19. The power supply circuit 16 is electrically connected to the Bluetooth circuit 17 and the adjustment control circuit 18 to supply power to the Bluetooth circuit 17 and the adjustment control circuit 18.

The Bluetooth circuit 17 is configured to be electrically connected to an external electronic device 100 having a Bluetooth function, such that the Bluetooth circuit 17 can receive a light emitting angle control signal sent by the external electronic device 100, and the Bluetooth circuit 17 can transmit the light emitting angle control signal to the adjustment control circuit 18. In one embodiment, the external electronic device 100 may be a smartphone, and an application program capable of controlling the LED lamp is installed on the smartphone. The user can select different light emitting angle requirements by operating the application program on a screen of the smartphone to generate different light emitting angle control signals. In other embodiments, the external electronic device 100 can also be a remote controller, and the remote controller generates different light emitting angle control signals in response to the user's operation on buttons corresponding to different light emitting angles on the remote controller.

The plurality of relays 19 are electrically connected to the driving power supply 4 and the LED lamp panel 2. The adjustment control circuit 18 is configured to control the corresponding relay 19 to turn on or off according to different light emitting angle control signals to control the driving power supply 4 to supply power to different light emitting elements 9, so as to control the first lamp bead 10, the second lamp bead 11, the third lamp bead 12, and the fourth lamp bead 13 of the LED lamp panel 2 to emit light.

In response to receiving a first light emitting angle control signal by the Bluetooth circuit 17, the first lamp bead 10 and the third lamp bead 12 emit light, and the second lamp bead 11 and the fourth lamp bead 13 do not emit light.

In response to receiving a second light emitting angle control signal by the Bluetooth circuit 17, the first lamp bead 10, the second lamp bead 11, the third lamp bead 12, and the fourth lamp bead 13 emit light.

In response to receiving a third light emitting angle control signal by the Bluetooth circuit 17, the second lamp bead 11 and the fourth lamp bead 13 emit light, and the first lamp bead 10 and the third lamp bead 12 do not emit light.

In this way, the user only needs to select the required light emitting angle of the LED lamp through the external electronic device 100, and the LED lamp can automatically control the lamp beads at different positions to emit light, so as to adjust the light emitting angle of the LED lamp to achieve the required light emitting effect.

Referring to FIG. 6, the controlling device 8 further includes a housing 14, and the housing 14 covers the first angle controller 20*a* to protect the first angle controller 20*a*.

Figure 9:
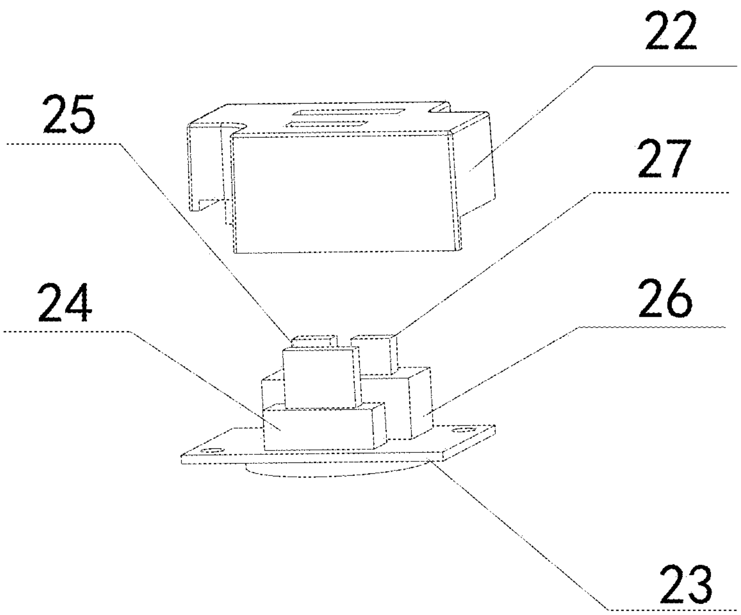
FIG. 9 is an exploded view of a portion of a controlling device in FIG. 6.

Referring to FIGS. 7 and 9, the light emitting angle controller includes a second angle controller 20*b*, which includes a switch base 23, a first electronic switch 24, and a first toggle 25. The switch base 23 is fixed to the power supply mounting portion 6. The first electronic switch 24 is fixedly mounted on the switch base 23. Both ends of the first electronic switch 24 are electrically connected to the driving power supply 4 and the LED lamp panel 2, respectively. The first toggle 25 is connected to the first electronic switch 24 and is configured to be toggled to change a state of the first electronic switch 24. The first electronic switch 24 is configured to control the first lamp bead 10, the second lamp bead 11, the third lamp bead 12, and the fourth lamp bead 13 to emit light according to different states thereof.

In response to a first state of the first electronic switch 24, the first lamp bead 10 and the third lamp bead 12 emit light, and the second lamp bead 11 and the fourth lamp bead 13 do not emit light.

In response to a second state of the first electronic switch 24, the first lamp bead 10, the second lamp bead 11, the third lamp bead 12, and the fourth lamp bead 13 emit light.

In response to a third state of the first electronic switch 24, the second lamp bead 11 and the fourth lamp bead 13 emit light, and the first lamp bead 10 and the third lamp bead 12 do not emit light.

In this way, the light emitting angle of the LED lamp can be adjusted to obtain the desired required light emitting effect only by operating the first toggle 25 of the second angle controller 20*b* to adjust the light emitting state of the four lamp beads.

In still another embodiment, the light emitting angle controller includes the first angle controller 20*a* and the second angle controller 20*b*. In this case, in the absence of a corresponding external electronic device 100, the light emitting angle of the LED lamp can be adjusted by the second angle controller 20*b*. In a case of a failure of the second angle controller 20*b*, the light emitting angle of the LED lamp can be adjusted by the corresponding external electronic device 100.

Referring to FIGS. 7 and 9, the controlling device 8 further includes a color temperature controller 21 configured to adjust the brightness of the light emitting elements 9. Specifically, the color temperature controller 21 includes the switch base 23, a second electronic switch 26, and a second toggle 27. The second electronic switch 26 is fixedly mounted on the switch base 23, and both ends of the second electronic switch 26 are electrically connected to the driving power supply 4 and the LED lamp panel 2, respectively. The second toggle 27 is connected to the second electronic switch 26 and is configured to be toggled to change a state of the second electronic switch 26. The second electronic switch 26 is configured to control the brightness of the first lamp bead 10, the second lamp bead 11, the third lamp bead 12, and the fourth lamp bead 13 according to different states thereof.

In use, when the color temperature needs to be adjusted, the second toggle 27 of the color temperature controller 21 can be toggled to change the state of the second electronic switch 26, and the second electronic switch 26 controls currents of the light emitting elements 9 according to different states thereof to control the brightness of the first lamp bead 10, the second lamp bead 11, the third lamp bead 12, and the fourth lamp bead 13, thereby adjusting the color temperature.

For example, when the first lamp bead 10 and the third lamp bead 12 emits light and the second lamp bead 11 and the fourth lamp bead 13 do not emit light, and the color temperature value needs to be 3000K, the second toggle 27 is toggled to change the second electronic switch 26 in a first state to control currents of the first lamp bead 10 and the third lamp bead 12, so that the color temperature value of the first lamp bead 10 is 2700K and the color temperature value of the third lamp bead 12 is 5700K, which make the color temperature value of the LED lamp to be 3000K.

When the first lamp bead 10 and the third lamp bead 12 emits light and the second lamp bead 11 and the fourth lamp bead 13 do not emit light, and the color temperature value needs to be 4000K, the second toggle 27 is toggled to change the second electronic switch 26 in a second state to control currents of the first lamp bead 10 and the third lamp bead 12, so that the color temperature value of the first lamp bead 10 is 3000K and the color temperature value of the third lamp bead 12 is 5000K, which make the color temperature value of the LED lamp to be 4000K.

When the first lamp bead 10 and the third lamp bead 12 emits light and the second lamp bead 11 and the fourth lamp bead 13 do not emit light, and the color temperature value needs to be 5000K, the second toggle 27 is toggled to change the second electronic switch 26 in a third state to control currents of the first lamp bead 10 and the third lamp bead 12, so that the color temperature value of the first lamp bead 10 is 5000K and the color temperature value of the third lamp bead 12 is 5000K, which make the color temperature value of the LED lamp to be 5000K.

When the first lamp bead 10, the second lamp bead 11, the third lamp bead 12 and the fourth lamp bead 13 emits light, and the color temperature value needs to be 3000K, the second toggle 27 is toggled to change the second electronic switch 26 in a fourth state to control currents of first lamp bead 10, the second lamp bead 11, the third lamp bead 12 and the fourth lamp bead 13, so that the color temperature value of the first lamp bead 10 and the color temperature value of the second lamp bead 11 are 2700K and the color temperature value of the third lamp bead 12 and color temperature value of the fourth lamp bead 13 is 5700K, which make the color temperature value of the LED lamp to be 3000K.

When the first lamp bead 10, the second lamp bead 11, the third lamp bead 12 and the fourth lamp bead 13 emits light, and the color temperature value needs to be 4000K, the second toggle 27 is toggled to change the second electronic switch 26 in a fifth state to control currents of first lamp bead 10, the second lamp bead 11, the third lamp bead 12 and the fourth lamp bead 13, so that the color temperature value of the first lamp bead 10 and the color temperature value of the second lamp bead 11 are 3000K and the color temperature value of the third lamp bead 12 and color temperature value of the fourth lamp bead 13 is 5000K, which make the color temperature value of the LED lamp to be 4000K.

When the first lamp bead 10, the second lamp bead 11, the third lamp bead 12 and the fourth lamp bead 13 emits light, and the color temperature value needs to be 5000K, the second toggle 27 is toggled to change the second electronic switch 26 in a sixth state to control currents of first lamp bead 10, the second lamp bead 11, the third lamp bead 12 and the fourth lamp bead 13, so that the color temperature value of the first lamp bead 10 and the color temperature value of the second lamp bead 11 are 5000K and the color temperature value of the third lamp bead 12 and color temperature value of the fourth lamp bead 13 is 5000K, which make the color temperature value of the LED lamp to be 5000K.

When the second lamp bead 11 and the fourth lamp bead 13 emits light and the first lamp bead 10 and the third lamp bead 12 do not emit light, and the color temperature value needs to be 3000K, the second toggle 27 is toggled to change the second electronic switch 26 in a seventh state to control currents of the second lamp bead 11 and the fourth lamp bead 13, so that the color temperature value of the second lamp bead 11 is 2700K and the color temperature value of the fourth lamp bead 13 is 5700K, which make the color temperature value of the LED lamp to be 3000K.

When the second lamp bead 11 and the fourth lamp bead 13 emits light and the first lamp bead 10 and the third lamp bead 12 do not emit light, and the color temperature value needs to be 4000K, the second toggle 27 is toggled to change the second electronic switch 26 in a eighth state to control currents of the second lamp bead 11 and the fourth lamp bead 13, so that the color temperature value of the second lamp bead 11 is 3000K and the color temperature value of the fourth lamp bead 13 is 5000K, which make the color temperature value of the LED lamp to be 4000K.

When the second lamp bead 11 and the fourth lamp bead 13 emits light and the first lamp bead 10 and the third lamp bead 12 do not emit light, and the color temperature value needs to be 5000K, the second toggle 27 is toggled to change the second electronic switch 26 in a ninth state to control currents of the second lamp bead 11 and the fourth lamp bead 13, so that the color temperature value of the second lamp bead 11 is 5000K and the color temperature value of the fourth lamp bead 13 is 5000K, which make the color temperature value of the LED lamp to be 5000K.

In this way, the color temperature of the LED lamp can be adjusted by operating the second toggle 27 to control the current of the light emitting elements 9 through the second electronic switch 26 to control the brightness of the four lamp beads.

Referring to FIG. 9, the controlling device 8 further includes a switch box 22. The switch box 22 covers the second angle controller **20*b* and the color temperature controller 21, so as to protect the second angle controller 20*b* and the color temperature controller 21, and provide a good dust-proof effect for the second angle controller 20*b* and color temperature controller 21**.

Figure 3:
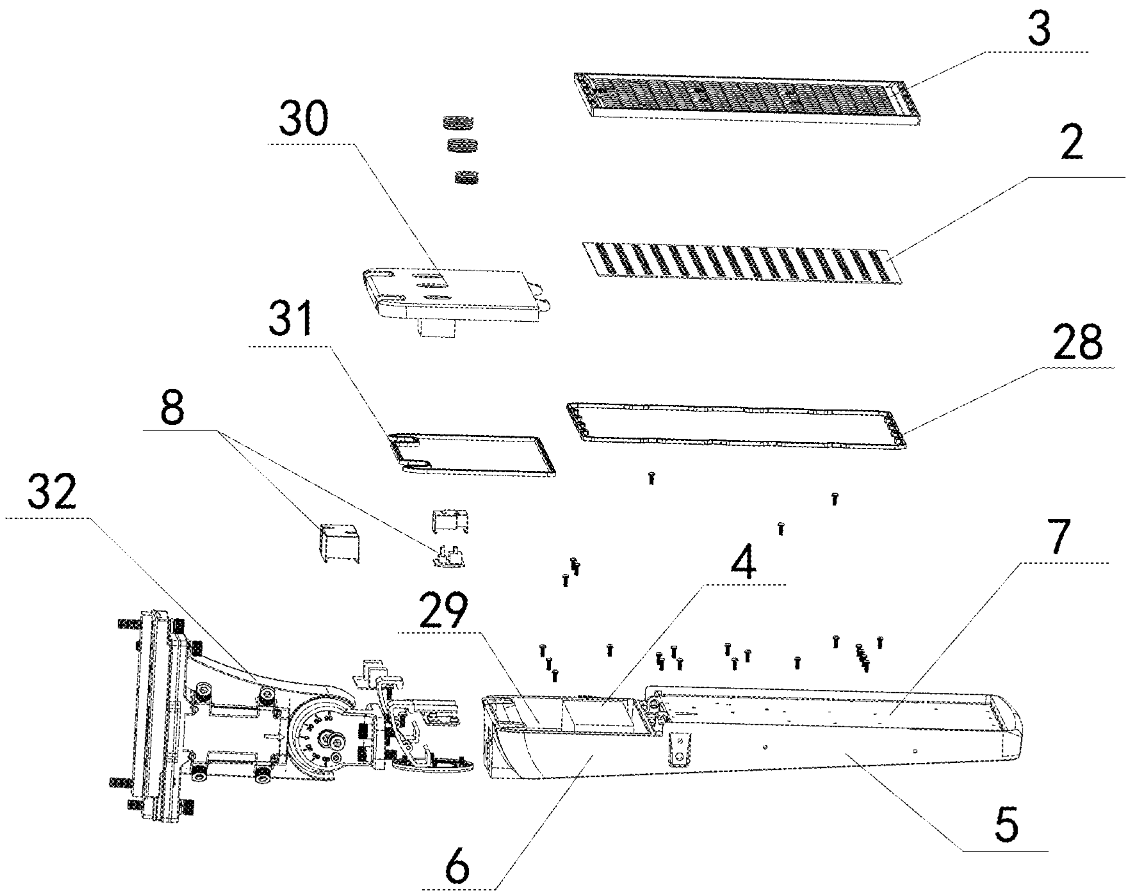
FIG. 3 is an exploded view of the LED lamp of FIG. 1.

Referring to FIG. 3, the LED lamp further includes a first sealing ring 28 provided between the lens plate 3 and the LED lamp panel 2, so that the LED lamp panel 2 has a good waterproof effect.

The power supply mounting portion 6 includes a power supply accommodating cavity 29 and a power supply cover 30. The driving power supply 4 is mounted in the power supply accommodating cavity 29. The power supply cover 30 covers the power supply accommodating cavity 29. One end of the power supply cover 30 is hinged to the heat dissipation base 1, and the other end of the power supply cover 30 is detachably connected to the heat dissipation base 1 by screws.

The LED lamp further includes a second sealing ring 31 provided between the power supply mounting portion 6 and the power supply cover 30, so that the power supply mounting portion 6 has a good waterproof effect.

The LED lamp further includes a mounting bracket 32 connected to the power supply mounting portion 6, and the mounting bracket 32 is configured to support the power supply mounting portion 6.

According to the LED lamp, when the light emitting angle of the LED lamp needs to be adjusted, the user only needs to select the required light emitting angle through the external electronic device 100 to control the light emitting elements 9 at different positions to emit light, or only needs to operate the second angle controller 20*b* to control the light emitting elements 9 at different positions to emit light. When the color temperature is required to be adjusted, only the color temperature controller 21 needs to be operate to adjust the brightness of the light-emitting elements 9. The lens plate 3 does not need to be replaced when the light emitting angle and the color temperature are adjusted, which saves the cost of replacing the lens plate 3, is more intelligent and humanized, and is safer and more reliable.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure.

What is claimed is:

1. An LED lamp, comprising:

a heat dissipation base comprising a lamp panel mounting portion and a power supply mounting portion connected to an end of the lamp panel mounting portion, the lamp panel mounting portion being provided with a mounting groove;

an LED lamp panel fixedly mounted in the mounting groove and comprising a plurality of light emitting elements;

a driving power supply mounted to the power supply mounting portion;

a lens plate covering the LED lamp panel; and a controlling device provided on the power supply mounting portion, wherein the controlling device is electrically connected between the LED lamp panel and the driving power supply and is configured to control each light emitting element corresponding different positions of the lens plate to emit light and adjust brightness of each light emitting element corresponding to different positions of the lens plate;

wherein the plurality of light emitting elements comprises at least two groups of light emitting elements arranged in a matrix;

wherein each group of the light emitting elements comprises a first lamp bead, a second lamp bead, a third lamp bead, and a fourth lamp bead, and a distance between the first lamp bead and the second lamp bead and a distance between the third lamp bead and the fourth lamp bead range from 0.8 mm to 1.2 mm, respectively;

wherein the controlling device comprises a first angle controller, the first angle controller comprises a power supply circuit, a Bluetooth circuit, an adjustment control circuit, and a plurality of relays, the power supply circuit is electrically connected to the Bluetooth circuit and the adjustment control circuit to supply power to the Bluetooth circuit and the adjustment control circuit, the Bluetooth circuit is configured to receive a light emitting angle control signal sent by an external electronic device and transmit the light emitting angle control signal to the adjustment control circuit, the plurality of relays are electrically connected to the driving power supply and the LED lamp panel, the adjustment control circuit is configured to control the corresponding relay to turn on or off according to different light emitting angle control signals to control the driving power supply to supply power to different light emitting elements, so as to control the first lamp bead, the second lamp bead, the third lamp bead, and the fourth lamp bead to emit light.

2. The LED lamp according to claim 1, wherein in response to receiving a first light emitting angle control signal by the Bluetooth circuit, the first lamp bead and the third lamp bead emit light, and the second lamp bead and the fourth lamp bead do not emit light;

in response to receiving a second light emitting angle control signal by the Bluetooth circuit, the first lamp bead, the second lamp bead, the third lamp bead, and the fourth lamp bead emit light;

in response to receiving a third light emitting angle control signal by the Bluetooth circuit, the second lamp bead and the fourth lamp bead emit light, and the first lamp bead and the third lamp bead do not emit light.

3. The LED lamp according to claim 1, wherein the controlling device further comprises a second angle controller, the second angle controller comprises a switch base, a first electronic switch, and a first toggle, the switch base is fixed to the power supply mounting portion, the first electronic switch is fixedly mounted on the switch base, both ends of the first electronic switch are electrically connected to the driving power supply and the LED lamp panel, respectively, the first toggle is connected to the first electronic switch and is configured to be toggled to change a state of the first electronic switch, and the first electronic switch is configured to control the first lamp bead, the second lamp bead, the third lamp bead, and the fourth lamp bead to emit light according to different states thereof.

4. The LED lamp according to claim 3, wherein in response to a first state of the first electronic switch, the first lamp bead and the third lamp bead emit light, and the second lamp bead and the fourth lamp bead do not emit light;

in response to a second state of the first electronic switch, the first lamp bead, the second lamp bead, the third lamp bead, and the fourth lamp bead emit light;

in response to a third state of the first electronic switch, the second lamp bead and the fourth lamp bead emit light, and the first lamp bead and the third lamp bead do not emit light.

5. The LED lamp according to claim 1, wherein the controlling device further comprises a color temperature controller, and the color temperature controller is configured to adjust the brightness of each light emitting element corresponding to different positions of the lens plate.

6. The LED lamp according to claim 5, wherein the color temperature controller comprises the switch base, a second electronic switch, and a second toggle, the second electronic switch is fixedly mounted on the switch base, both ends of the second electronic switch are electrically connected to the driving power supply and the LED lamp panel, respectively, the second toggle is connected to the second electronic switch and is configured to be toggled to change a state of the second electronic switch, and the second electronic switch is configured to control the brightness of the first lamp bead, the second lamp bead, the third lamp bead, and the fourth lamp bead according to different states thereof.

7. The LED lamp according to claim 1, further comprising a first sealing ring provided between the lens plate and the LED lamp panel.

8. The LED lamp according to claim 1, wherein the power supply mounting portion comprises a power supply accommodating cavity and a power supply cover, the driving power supply is mounted in the power supply accommodating cavity, the power supply cover covers the power supply accommodating cavity, one end of the power supply cover is hinged to the heat dissipation base, and another end of the power supply cover is detachably connected to the heat dissipation base by screws.

9. The LED lamp according to claim 8, further comprising a second sealing ring and a mounting bracket, wherein the second sealing ring is provided between the power supply mounting portion and the power supply cover, and the mounting bracket is connected to the power supply mounting portion.

* * * * *